United States Patent [19]
Gilardi et al.

[11] Patent Number: 5,243,648
[45] Date of Patent: Sep. 7, 1993

[54] PROTECTIVE DEVICE FOR COMPUTERS AND THE LIKE

[75] Inventors: Giovanni Gilardi; Severino Scarazini, both of Turin, Italy

[73] Assignee: Data Protection S.R.L., Turin, Italy

[21] Appl. No.: 855,040

[22] PCT Filed: Oct. 26, 1990

[86] PCT No.: PCT/EP90/01914
§ 371 Date: May 1, 1992
§ 102(e) Date: May 1, 1992

[87] PCT Pub. No.: WO91/07798
PCT Pub. Date: May 30, 1991

[30] Foreign Application Priority Data
Nov. 10, 1989 [IT] Italy ................ 67986 A/89

[51] Int. Cl.$^5$ .................. H04K 1/02; H04K 3/00; H02H 9/00
[52] U.S. Cl. .................. 380/6; 361/56; 361/58; 361/111; 455/1
[58] Field of Search .......... 380/6; 455/1; 361/56, 361/58, 111

[56] References Cited

U.S. PATENT DOCUMENTS

| | | |
|---|---|---|
| 3,806,882 | 4/1974 | Clarke . |
| 4,802,055 | 1/1989 | Beckerman . |
| 4,932,057 | 6/1990 | Kolbert .................. 380/33 |
| 5,165,098 | 11/1992 | Hoivik .................. 380/8 |

FOREIGN PATENT DOCUMENTS 0240328 10/1987 European Pat. Off. .

Primary Examiner—Stephen C. Buczinski
Attorney, Agent, or Firm—Merchant & Gould, Smith, Edell, Welter & Schmidt

[57] ABSTRACT

In order to protect computers and the like against the pick up, the recording and the unauthorized use of data from the computers during the working thereof, and to protect them against high energy transient disturbances taking place on the main A.C. power line, a filter unit (1) is foreseen comprising a plurality of sections (19) comprising inductances (21) and capacitances (23), between which it is interposed at least a gas-discharge surge arrester (25) and varistors (27), and masking unit (3) comprising a power supply (31), a white noise generator (33) and an amplifier (35) emitting from the antenna circuit (61) said properly amplified white noise which is completely random and unpredictable, and therefore impossible to be decoded.

6 Claims, 4 Drawing Sheets

PROTECTIVE DEVICE FOR COMPUTERS AND THE LIKE

The present invention relates to a protective device for computers and the like, adapted to prevent the pick up, the recording and the unauthorized use of data from the computers during the working thereof, and to protect them against high energy transient disturbances taking place on the main A.C. power line.

It is known that normally operating electronic devices can behave both as sources and receivers of electromagnetic waves. More particularly the computers, when considered as receivers can be disturbed or in case damaged by sudden high energy transients (natural lightnings, voltage switchings, switching noises due to transitions in low and medium voltage substations by the supplying company, radiowaves generated by industrial installments, sporadic disturbances caused by house appliances or motorcars, etc.) that can take place on the A.C. power line to which they are connected; when considered as sources, computers can radiate information carrying electromagnetic waves that can nullify the data privacy when properly picked up.

The electromagnetic waves generated from computers and their peripheral equipments (video terminals, printers peripheral disk drivers, tape drivers, etc.) can be either directly radiated through air or guided through the power supply cables and hence along the power distribution network, thus turning this latter in a sort of radiating antenna having quite extended size and easy to be reached by people aiming to unauthorized data gathering.

More precisely, the signals within a data processing system can produce undesired emission through the following mechanisms:

A)—The information can be found recovered as an amplitude or phase modulation of the current adsorbed from the electric main.

This may happens since the power supply has to feed also the current for the signal processing circuit and the interface circuits preparing for and adapting the same to the different periheral devices.

When using a switching power supply, the information signal can be present in form of a modulation of carriers at a rather high frequency.

Indeed, any change of the current drawn from the switching power supply by the load causes a change in the duty cycle of the device acting as a switch (chopper), this latter in turn has switching times quite short and consequentely generates high frequency spectrum components.

It is evident that such signals generated in the feeder circuit propagate more easily as signals guided through the power network.

B)—The radiated emission that is more easily reduced to the information caused by the data processing can originate either from sources within the system or actuated by phoenomena in the outer environment but anyhow strictly related to the electronic circuits controlling the generation of the image for a video terminal and the interfacing circuits, circuitry and wirings connected thereto (graphic boards, color boards, etc.).

Namely, these circuits besides forming the baseband video signals (more than 5 MHz wide), are a source of spurious signals that contains the video signal in form of amplitude modulation, and therefore the confidential information that is the result of the processing system at the precise moment.

The drive for these undesired emission can take place by means of a "beating" with electromagnetic fields present in the environment (circular video channel carriers or AM or FM radio stations carriers), or with electromagnetic fields purposely generated and transmitted by people interested to pick up the confidential information.

EP 0 240 328 in the name of Datasafe Ltd. provides a computer security device, with a view to preventing access to data stored in a computer installation by remote sensing of stray electromagnetic radiation emitted by the installation. This invention, however, can only protect a single computer, to which is directly connected by means of an antenna, at a time, because its type of antenna, being a flexible wire to be wound around the computer connection cables, can be connected to one computer only, and is composed of an elaborate and complicated apparatus, including a receiver for capturing the typical frequence of the single computer to which it is connected, a demodulator, a transistor-amplifier and a transmitter.

Other drawbacks of the invention disclosed in EP 0 240 328 are that it protects only the main frequencies of a computer, singled out by the receiver, and not the whole range of available frequencies, thus not being able to cover all possible uses of a computer (military ones, for example); moreover, the antenna of the invention is wired around the computer cables and requires being installed by a skilled person.

Purpose of the present invention is that of overcoming the above drawbacks in the computer protection area, both against pick up, recording and unauthorized use of data and against high energy transient disturbances.

Another purpose of the present invention is that its antenna is not connected to any computer in particular, thus protecting more than one computer at a time, provided that they are inside the antenna's field of operation.

Another purpose still of the present invention is that the device picks up and protects the whole range of available frequencies, and not only the one typical of a computer, being of a highly new construction, including an amplifier with hybrid circuits and a highly developed white noise generator, that enables it to continuously provide disturbance signals throughout the frequency spectrum.

Another purpose of the present invention is that its filler unit can prevent both line disturbances towards the computer, and the computer itself from disturbing the environment with its radiated frequency.

Another purpose still of the present invention is that it can easily be installed by any person, and not by a qualified technician only, since its antenna must not be neither mechanically, nor physically, nor electrically connected or wound around any part of the computer or any connection cable between said parts.

These and other purposes of the present invention, as they will appear from the description below, will be provided by the present invention as described in claim 1.

The invention will now be described in detail with particular reference to the attached drawings, given as a non limiting example and showing a preferred embodiment of the invention, in which.

As it is evident from the figures, the subject device substantially is made up by two units: a network or line filter unit 1 and a masking unit 3.

Figure 1:
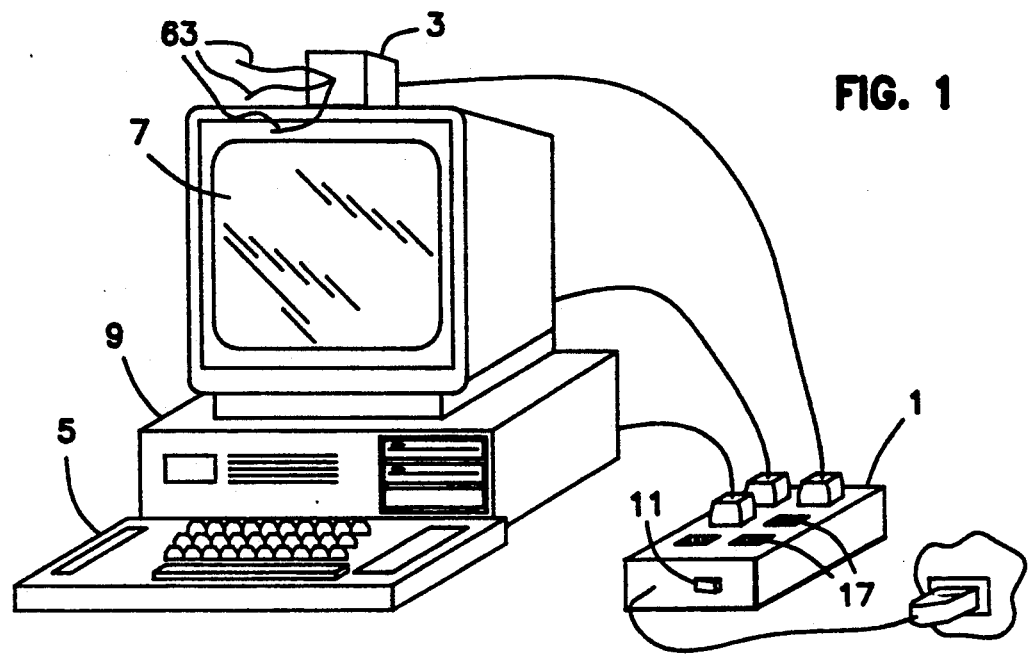
FIG. 1 is a schematic perspective view illustrating a computer connected to the units forming the subject device.

Said units 1 and 3 are shown in FIG. 1 as applied to a conventional personal computer also shown in the figure and comprising a keyboard 5, a video display 7 and the computer 9.

It has been deemed proper to represent said units 1 and 3 as connected to a computer in order to put in evidence their volumes and to roughly show the physical size thereof.

Figure 2:
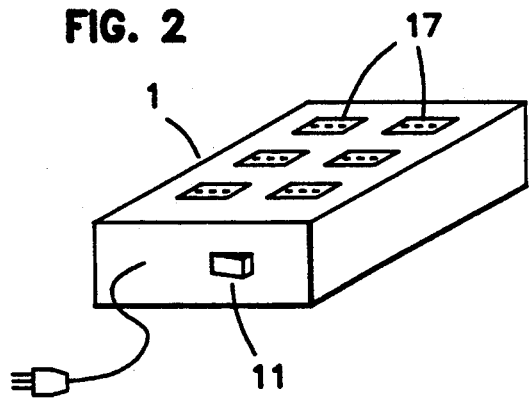
FIG. 2 is an external schematic perspective view of the network filter unit.
Figure 3:
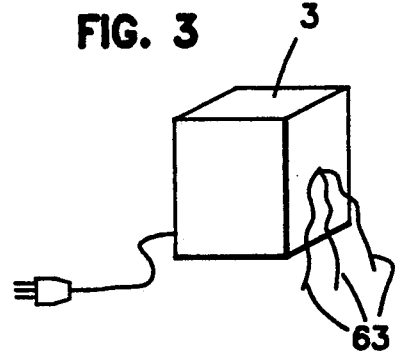
FIG. 3 is an external schematic perspective view of the masking unit.

In FIGS. 2 and 3 said filter and masking units 1 and 3 are represented as separate units for a better clearness.

The network filter unit 1 is provided to protect all the electronic devices connected thereto from possible transients and surges in the power distribution network, at the same time drastically attenuating guided signals that might come out of the electronic devices themselves.

Figure 4:
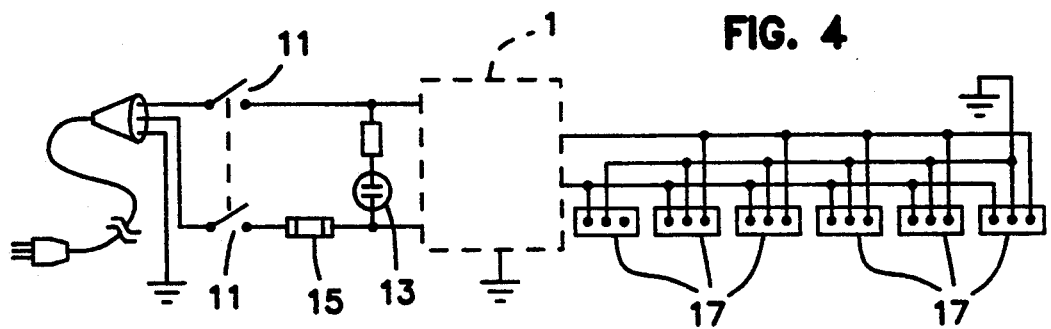
FIG. 4 is a diagram showing the positioning of the filter unit.

FIG. 4 is a circuit diagram showing the allocation of a filter unit 1: in such diagram it is further shown the power supply circuit for such filter unit: 11 indicates a switch, 13 an indicator lamp, 15 a fuse, 17 a number of user connectors.

Figure 5:
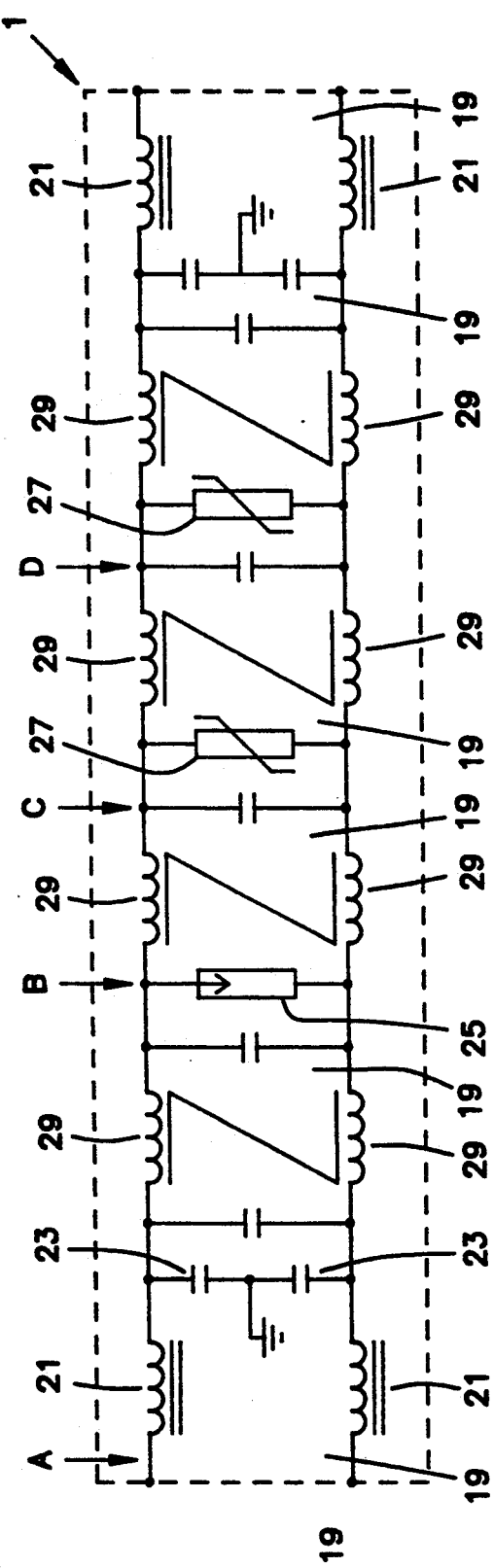
FIG. 5 is an electric diagram illustrating said filter unit.

FIG. 5 illustrates the circuit diagram of a filter unit 1. It comprises a number of inductors 21 and capacitors 23 (L-C) sections 19 interposed between gas-discharge valves or surge arresters 25 and metal oxide varistors 27.

Some inductors 21 are individually wound on ferrite sticks whereas some other indicated at 29 are wound in pairs over tori; this construction provides a good attenuation of disturbances, surges, interferences, etc., both common mode and differential mode.

The gas-discharge arresters 25 are devices whose inner resistance becomes quite low when the voltage applied to their terminals exceed a predetermined conduction threshold, being able to bypass or short-circuit currents in the order of several kA and returning to the original status, ready for future events after the transient ceases.

The metal oxide varistors are resistors the resistive value of which varies inversely with the voltage applied to their terminals and therefore exhibits an decreasing resistance value to an increasing voltage, thus allowing for the flow of a gradually increasing current.

The purpose of the L-C sections 19 is that of attenuating the high frequencies guided towards the power distribution network, by about of 80 dB (about 10,000 times) in a bandwidth extending approximately from 1 MHz to 1.5 GHz.

In the illustrated embodiment of the filter unit 1 four sections are provided, see FIG. 5.

From the graphs of FIG. 8 it can be seen the way a hypothetical high power transient or surge is "treated" by said filter unit 1 in the different passages.

In A it is illustrated a hypothetical voltage surge with a slope of about 1 kV/$\mu$s (FIG. 8a); in B said surge is "clipped" at about 600 V (FIG. 8b); in C at about 400 V (FIG. 8c); and in D at about 250 V (FIG. 8d) within a time delay in the order of 1 $\mu$s.

the voltage level of the surge, now reduced to the indicated value, is no longer fearful, nor is able to damage the users apparatuses, of the type of a computer.

It is evident that such filter unit can be designed for different rates, wherein the components are properly dimensioned as a function of the A.C. values requested by the different user typology.

Figure 6:
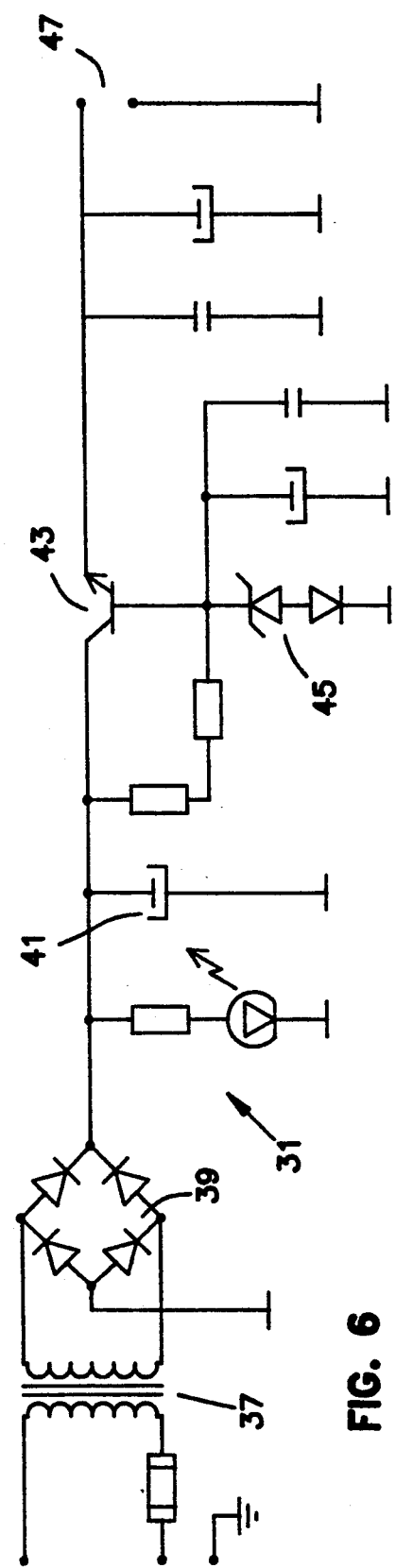
FIG. 6 is an electric diagram illustrating the power supply of the masking unit.
Figure 7:
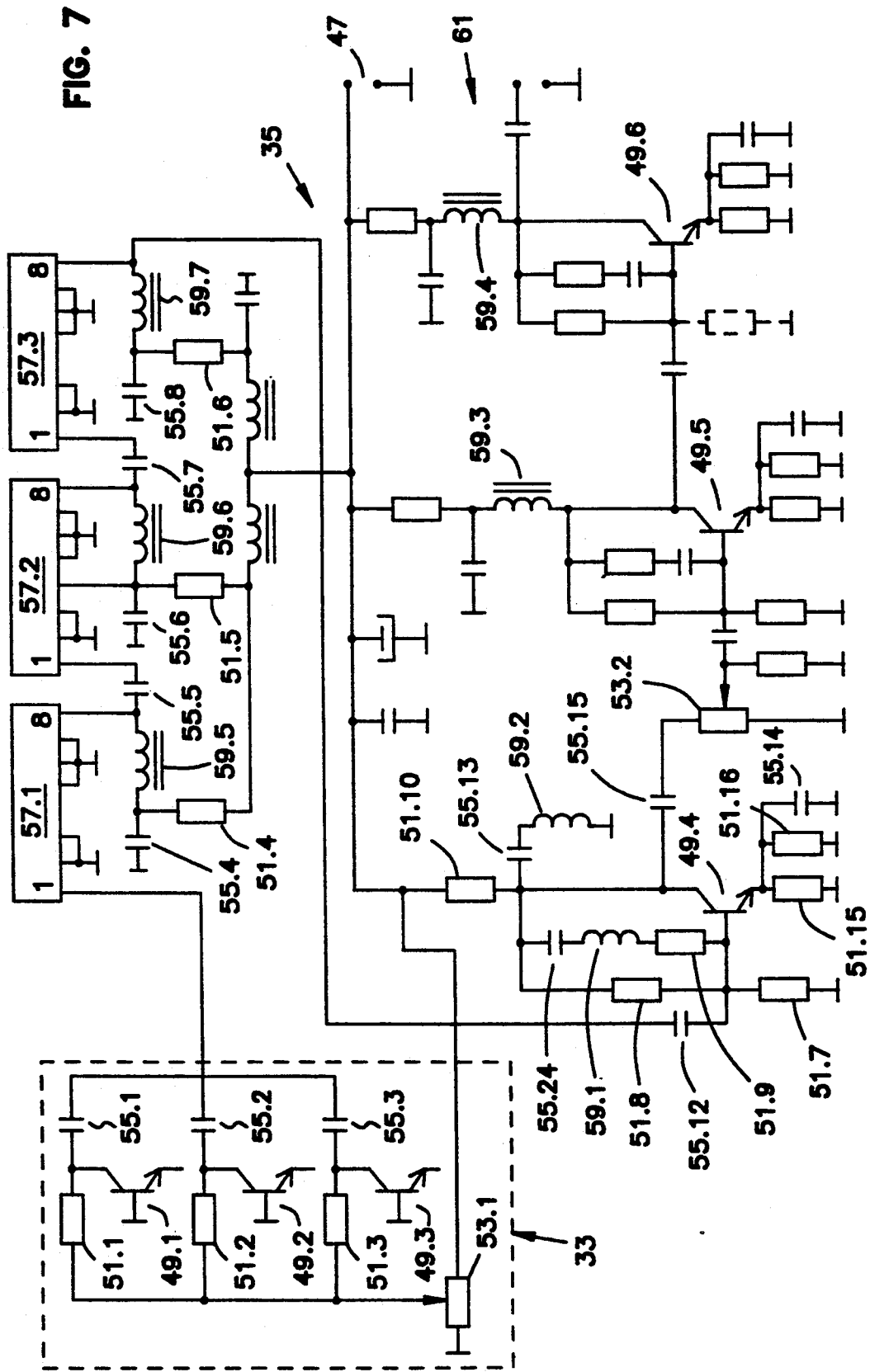
FIG. 7 is an electric diagram of the masking unit, and more particularly of the white noise generator and of the successive amplifier.
Figure 8A:
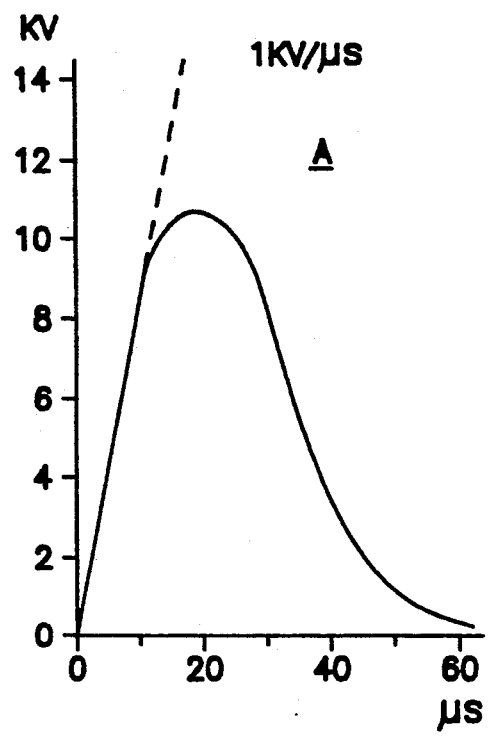
Figure 8B:
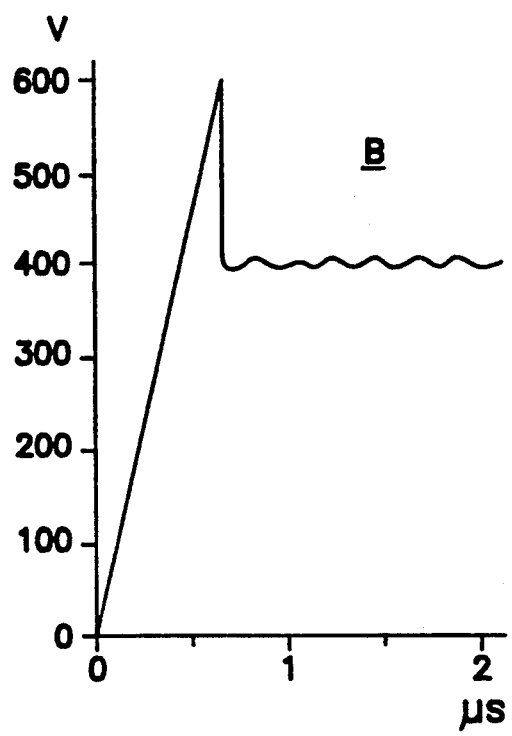
Figure 8C:
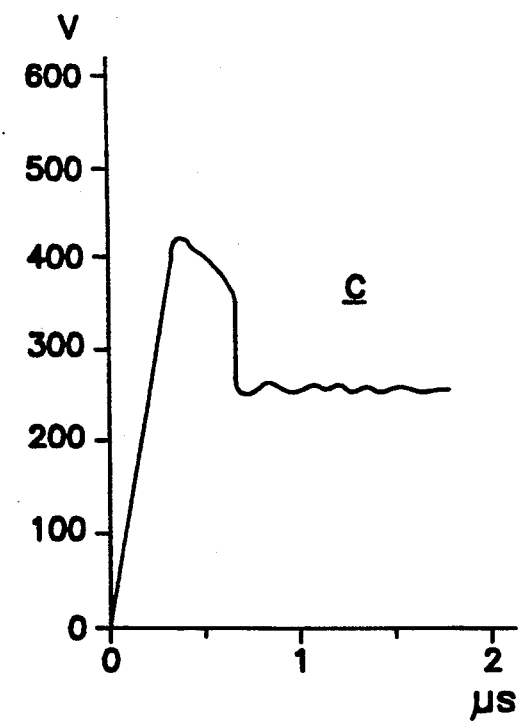
Figure 8D:
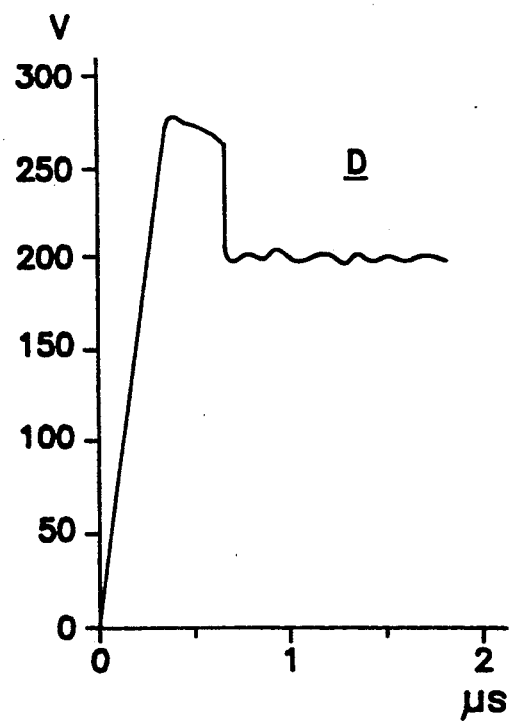

The masking unit 3 substantially comprises three sections:
 a power supply 31 (FIG. 6)
 a white noise generator 33 (FIG. 7)
 a wide band amplifier 35 and antenna circuit (FIG. 7).

The power supply 31 (FIG. 6) is a conventional power supply comprising a transformer 37 having a high insulation between the primary and the secondary windings (in the order of 4,000 V as a safety against dangerous discharges) which converts the mains voltage (220 V A.C.) in a proper low voltage (about 13 V A.C.), a diode bridge 39 and a capacitor 41 rectifying the A.C. voltage and converting it inot a D.C. voltage.

The transistor 43 together with the Zener diode 45 stabilize the D.C. voltage at the proper value of 12 V D.C., at output 47, a value adapted for the working of the successive stations.

The white noise generator 33 is obtained by means of the reverse biasing of three transistors 49 (49.1, 49.2, 49.3) through three resistors 51 (51.1, 51.2, 51.3) and a potentiometer 53.1.

Due to the dispersion of the characteristics of the three transistors 49, a continuous spectrum from about 1 MHz to about 1.5 GHz is generated which is completely random and unpredictable, and therefore impossible to be decoded.

The so generated white noise is applied to the successive section 35 through the capacitors 55 (55.1, 55.2, 55.3)

The wideband amplifier and antenna circuit 35 is designed in such a way as to linearly amplify the signal from the preceding stage within the whole considered bandwidth.

The amplifier circuit 35 substantially comprises:
 three hybrid circuits 57 (57.1, 57.2, 57.3) being fed by the power supply through the resistors 51.4, 51.5, 51.6, respectively; the capacitors 55.4, 55.6 and 55.8 being provided for eliminating possible spurious components.

The radiofrequency output of the hybrid circuits 57 is present at the terminal 8 thereof, the inductors 59.5, 59.6 and 59.7 acting as choke coils to prevent the useful signal from propagating towards the power supply.

The capacitor 55.5 couples the output of the hybrid circuit 57.1 to the input of the circuit 57.2; the capacitor 55.7 couples the output of 57.2 to the input of 57.3, and finally the capacitor 55.12 couples the output of 57.3 to the rest of the circuit.

three transistors 49.4, 49.5, 49.6; the transistor 49.4 being properly biased by resistors 51.7, 51.8, 51.10, 51.15, 51.16; the capacitor 55.14 providing a moderate feedback. The oscillating circuits formed by resistor 51.9, inductor 59.1 and capacitor 55.24, and by capacitor 55.13 and inductor 59.2, respectively, serving to linearize the radiofrequency output from transistor 49.4 that is present on capacitor 55.15 acting as a decoupling capacitor between this stage and the successive.

The potenziometer 53.2 is used to adjust the level of the power radiated from the antenna circuit 61 within such limits as to comply with the rules en force (Rules CENELEC).

The transistors 49.5 and 49.6 are substantially the core of two cascaded amplifier circuits adapted to further amplify the signal and to match it to the above mentioned antenna circuit 61.

The inductors or inductance coils 59.3 and 59.4 are chokes to prevent the useful signal from propagating towads the power supply.

an antenna 61 externally formed by a certain number of wires 63 having proper lengths and freely disposed in the environment to be protected.

As already indicated, all the users must be connected to the filter unit 1 (including the masking unit 3) in order to be protected against the electrical disturbances and surges from outside, thus preventing at the same time the risk of guided signals outcoming from the electronic apparatuses being picked up by the power distribution network.

The masking unit 3 must be located as near as possible to the system video terminal 7 to be protected.

This way the emission of white noise over an extended spectrum of frequencies by said unit 3 hides also the emission in a certain frequency which is typical of the system.

In other words, a person attempting to pick up at any distance the signals radiated by the video terminal (or the computer), by means of an antenna of the TV type (in case properly modified) or by means of any other trick, simultaneously receives on the same wavelenght also the white noise signal emitted by the masking unit.

Since this signal is isofrequential and completely random it cannot be discriminated from the signal coming from the data processing system, and the pick up thereof is rendered useless.

Although the external appearance of the filter unit 1 is substantially a technical one, so that it is not very different from a distribution box with a plurality of outlet connectors, the masking unit 3 can be associated to or camouflaged as one of the objects usually present on desks, such as a pen-holder a paper-weight, containers for various items, table-clock, etc.

All the above is rendered possible and easier since the volume required by the electronics is about ½ cubic decimeter.

Of course the material of the outer envelope can be of any type, this latter being of no relevance to the proper working of the device.

It is evident that the invention is not limited to the described and illustrated embodiment, but several modifications and additional improvements can be carried out within the scope of the invention.

We Claim:

1. A protective device for a digital computer to protect the computer against high energy transient disturbances taking place on a main A.C. power line, and to prevent the pick up, the recording and the unauthorized use of data from the computer during the operation thereof, the protective device comprising:

(a) a network filter unit electrically connected between the computer and the main A.C. power line, the network filter comprising a plurality of sections having inductances and capacitances, the sections interposed between gas-discharge surge arresters and variable resistors, the gas-discharge arresters bypassing electrical currents when subjected to a voltage higher than a conduction threshold, the variable resistors having an inverse resistance value function of the applied voltage, such that with an increase of the applied voltage, the electrical resistance becomes smaller, thereby conducting a larger current; and (b) a masking unit placed in close physical proximity to a video display of the computer, the masking unit comprising:
   (1) a power supply electrically connected to the main A.C. power line;
   (2) a random signal generator electrically connected to the power supply;
   (3) a wideband amplifier and antenna circuit electrically connected to the random signal generator to linearly amplify a signal from the random signal generator within a predetermined radiated frequency (RF) bandwidth; and
   (4) an antenna electrically connected to the wideband amplifier, the antenna formed by a plurality of wires freely disposed in the environment to be protected, such that an emitted RF signal is essentially random across the predetermined RF bandwidth.

2. The protective device of claim 1, wherein the network filter unit and the masking unit are physically connected together as a whole device, the protective device preventing both line disturbances towards the computer and preventing the computer from disturbing the environment with a RF signal by having the plurality of sections attenuating the high frequencies guided to the power distribution network by substantially 80 dB in a bandwidth substantially extending from 1 MHz to 1.5 GHz.

3. The protective device of claim 1, wherein the random signal generator is obtained by means of the biasing at least three transistors through at least three resistors and a potentiometer, the dispersion of the characteristics of the at least three resistors generating a continuous spectrum of frequencies which is substantially random and unpredictable, the random signal being applied to each of the plurality of sections through at least three capacitors.

4. The protective device of claim 3, wherein the random signal generator further comprises:
   (a) the first of the at least three transistors biased by at least one resistor;
   (b) a capacitor electrically connected to the at least three transistors for providing a feedback signal;
   (c) at least two oscillating circuits electrically connected to the capacitor for linearizing the RF signal;
   (d) the potentiometer electrically connected to the at least two oscillating circuits for adjusting a level of power radiated from the antenna;
   (e) the second and third of the at least three transistors electrically connected to the potentiometer for forming two cascaded amplifier circuits to further amplify the RF signal; and
   (f) at least two choke coils electrically connected to the second and third of the at least three transistors for preventing the RF signal from propagating towards the power supply.

5. The protective device of claim 1, wherein the power supply comprises:
   (a) a transformer electrically connected to the main A.C. power line having a high insulation between a primary winding and a secondary winding for converting a main voltage into a lower voltage;
   (b) a rectifier comprising a diode bridge and a capacitor electrically connected to the transformer for rectifying the A.C. voltage and for converting it into a D.C. voltage; and
   (c) a stabilizer comprising a transistor and a Zener diode electrically connected to the rectifier for stabilizing the D.C. voltage at a predetermined level.

6. The protective device of claim 1, wherein the antenna is physically placed inside the protective device, the antenna being suitable to protect one or more computers within the range of operation of the antenna.

* * * * *